United States Patent
Inoue et al.

(10) Patent No.: US 12,112,664 B2
(45) Date of Patent: Oct. 8, 2024

(54) CONTROL DEVICE, CONTROL METHOD, CONTROL PROGRAM, AND PROJECTION SYSTEM

(71) Applicant: FUJIFILM Corporation, Tokyo (JP)

(72) Inventors: Kazuki Inoue, Saitama (JP); Tomonori Masuda, Saitama (JP); Akihiro Ishizuka, Saitama (JP); Kazuki Ishida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/311,614

(22) Filed: May 3, 2023

(65) Prior Publication Data

US 2023/0274675 A1    Aug. 31, 2023

Related U.S. Application Data

(63) Continuation of application No. PCT/JP2021/038836, filed on Oct. 20, 2021.

(30) Foreign Application Priority Data

Nov. 18, 2020 (JP) ................. 2020-191745

(51) Int. Cl.
G09G 3/00        (2006.01)
G06F 3/0346    (2013.01)

(52) U.S. Cl.
CPC ............ G09G 3/002 (2013.01); G06F 3/0346 (2013.01); *G09G 2340/0464* (2013.01); *G09G 2354/00* (2013.01)

(58) Field of Classification Search
None
See application file for complete search history.

(56) References Cited

U.S. PATENT DOCUMENTS 10,037,120 B2    7/2018  Arizumi
10,276,133 B2 *  4/2019  Uema ................. H04N 9/31
(Continued)

FOREIGN PATENT DOCUMENTS

JP    2012-185630 A    9/2012
JP    2012-194850 A    10/2012
(Continued)

OTHER PUBLICATIONS

International Preliminary Report on Patentability and the Written Opinion of the International Searching Authority for International Application No. PCT/JP2021/038836, dated Jul. 7, 2022, with an English translation.
(Continued)

*Primary Examiner* — Matthew Yeung
(74) *Attorney, Agent, or Firm* — Birch, Stewart, Kolasch & Birch, LLP

(57) ABSTRACT

A control device of a projection apparatus that projects an image to a projection target object, includes a processor, and the processor is configured to, in response to reception of a first operation by an operation portion for operating the projection apparatus, perform a control of projecting an operation image for operation of the projection apparatus from the projection apparatus to a part, in a projection range of the projection apparatus, determined based on second information different from first information obtained by the first operation performed on the operation portion

16 Claims, 7 Drawing Sheets

(56) References Cited

U.S. PATENT DOCUMENTS

| | | | | |
|---|---|---|---|---|
| 2004/0046736 A1* | 3/2004 | Pryor | ................... | G16H 50/50 |
| | | | | 345/156 |
| 2013/0055126 A1* | 2/2013 | Jackson | .............. | G06F 3/04845 |
| | | | | 715/769 |
| 2014/0218300 A1 | 8/2014 | Muraki et al. | | |
| 2020/0129156 A1* | 4/2020 | Elgena | .................. | A61B 8/465 |
| 2021/0109428 A1* | 4/2021 | Ichieda | ................ | G03B 21/147 |

FOREIGN PATENT DOCUMENTS

| | | |
|---|---|---|
| JP | 2013-80296 A | 5/2013 |
| JP | 2017-227985 A | 12/2017 |
| JP | 2019-110373 A | 7/2019 |
| JP | 2020-21316 A | 2/2020 |
| JP | 2020-35176 A | 3/2020 |

OTHER PUBLICATIONS

International Search Report for International Application No. PCT/JP2021/038836, dated Jan. 11, 2022, with English translation.

\* cited by examiner

CONTROL DEVICE, CONTROL METHOD, CONTROL PROGRAM, AND PROJECTION SYSTEM

CROSS REFERENCE TO RELATED APPLICATION

This is a continuation of International Application No. PCT/JP2021/038836 filed on Oct. 20, 2021, and claims priority from Japanese Patent Application No. 2020-191745 filed on Nov. 18, 2020, the entire disclosures of which are incorporated herein by reference.

BACKGROUND OF THE INVENTION

1. Field of the Invention

The present invention relates to a control device, a control method, a computer readable medium storing a control program, and a projection system.

2. Description of the Related Art

JP2017-227985A discloses a projection apparatus that projects an operation image for a user to a range within a reach of the user in a case where a subject detected by an imaging portion is only the user (presenter). JP2012-194850A discloses a configuration in which in a case where an instruction position of a pen-type device operated by an operator is detected by an infrared light reception portion, a PC connected to a projector projects a menu image close to the instruction position of the pen-type device. JP2019-110373A discloses a projector in which a user can arbitrarily select a projection position of a GUI by operating a remote controller.

SUMMARY OF THE INVENTION

One embodiment according to the disclosed technology provides a control device, a control method, a computer readable medium storing a control program, and a projection system that can facilitate control of a projection apparatus using a projected operation image.

A control device according to an aspect of the present invention is a control device of a projection apparatus that projects an image to a projection target object, the control device comprising a processor, in which the processor is configured to, in response to reception of a first operation by an operation portion for operating the projection apparatus, perform a control of projecting an operation image for operation of the projection apparatus from the projection apparatus to a part, in a projection range of the projection apparatus, determined based on second information different from first information obtained by the first operation performed on the operation portion.

A control method according to another aspect of the present invention is a control method of a projection apparatus that projects an image to a projection target object, the control method comprising, by a processor of the projection apparatus, performing, in response to reception of a first operation by an operation portion for operating the projection apparatus, a control of projecting an operation image for operation of the projection apparatus from the projection apparatus to a part, in a projection range of the projection apparatus, determined based on second information different from first information obtained by the first operation performed on the operation portion.

A control program, which is stored in a computer readable medium, according to still another aspect of the present invention causes a processor of a projection apparatus that projects an image to a projection target object, to execute a process comprising performing, in response to reception of a first operation by an operation portion for operating the projection apparatus, a control of projecting an operation image for operation of the projection apparatus from the projection apparatus to a part, in a projection range of the projection apparatus, determined based on second information different from first information obtained by the first operation performed on the operation portion.

A projection system according to still another aspect of the present invention comprises a projection apparatus that projects an image to a projection target object, and a control device of the projection apparatus that, in response to reception of a first operation by an operation portion for operating the projection apparatus, performs a control of projecting an operation image for operation of the projection apparatus from the projection apparatus to a part, in a projection range of the projection apparatus, determined based on second information different from first information obtained by the first operation performed on the operation portion.

According to the present invention, it is possible to provide a control device, a control method, a computer readable medium storing a control program, and a projection system that can facilitate control of a projection apparatus using a projected operation image.

DESCRIPTION OF THE PREFERRED EMBODIMENTS

Hereinafter, an example of embodiments of the present invention will be described with reference to the drawings.

Embodiment 1

Figure 1:
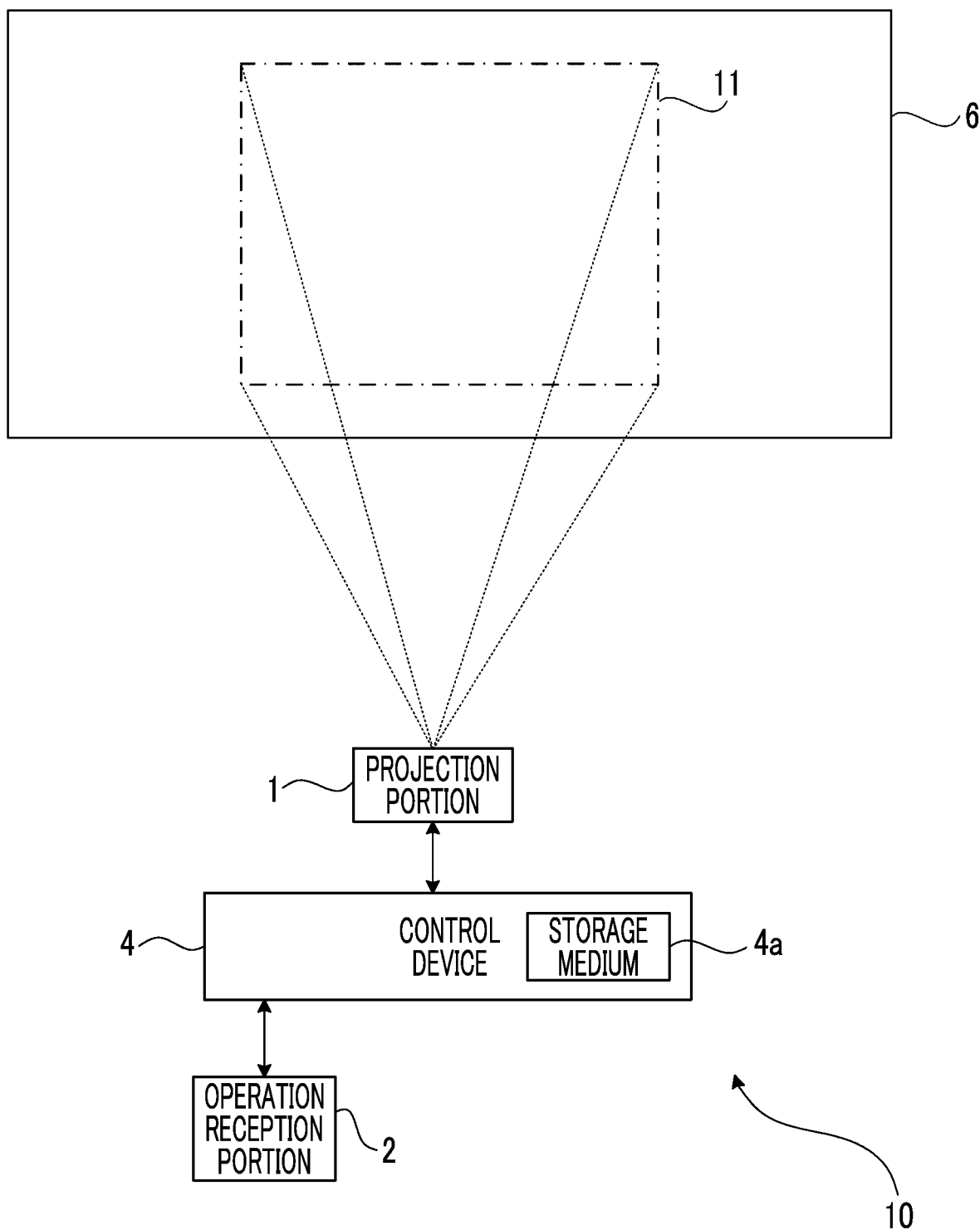
FIG. 1 is a schematic diagram illustrating a schematic configuration of a projection apparatus 10 to which a control device of Embodiment 1 is applied.

Schematic Configuration of Projection Apparatus 10 to Which Control Device of Embodiment 1 Is Applied FIG. 1 is a schematic diagram illustrating a schematic configuration of a projection apparatus 10 to which a control device of Embodiment 1 is applied.

The projection apparatus 10 comprises a projection portion 1, a control device 4, and an operation reception portion 2. The projection portion 1 is configured with, for example, a liquid crystal projector or with a projector using liquid crystal on silicon (LCOS). Hereinafter, the projection portion 1 will be described as a liquid crystal projector.

The control device 4 controls projection performed by the projection apparatus 10. In addition, the control device 4 is an example of a control device according to an embodiment of the present invention. The control device 4 is a device including a control portion configured with various processors, a communication interface (not illustrated) for communicating with each portion, and a storage medium 4a such as a hard disk, a solid state drive (SSD), or a read only memory (ROM) and manages and controls the projection portion 1. Examples of the various processors of the control portion of the control device 4 include a central processing unit (CPU) that is a general-purpose processor performing various processing by executing a program, a programmable logic device (PLD) such as a field programmable gate array (FPGA) that is a processor having a circuit configuration changeable after manufacture, or a dedicated electric circuit such as an application specific integrated circuit (ASIC) that is a processor having a circuit configuration dedicatedly designed to execute specific processing.

More specifically, a structure of these various processors is an electric circuit in which circuit elements such as semiconductor elements are combined. The control portion of the control device 4 may be configured with one of the various processors or may be configured with a combination of two or more processors of the same type or different types (for example, a combination of a plurality of FPGAs or a combination of a CPU and a FPGA).

The operation reception portion 2 detects instructions (user instructions) from a user by receiving various operations from the user. In the present embodiment, the operation reception portion 2 is an operation portion such as a button, a key, or a joystick provided in a body of the projection apparatus 10. Accordingly, in a case where the operation reception portion 2 is operated, it can be determined that the user is positioned near the projection apparatus 10.

A projection target object 6 is an object such as a screen having a projection surface on which a projection image is displayed by the projection portion 1. In the example illustrated in FIG. 1, the projection surface of the projection target object 6 is a rectangular plane in the projection target object 6. It is assumed that upper, lower, left, and right sides of the projection target object 6 in FIG. 1 are upper, lower, left, and right sides of the actual projection target object 6.

A projection range 11 illustrated by a dot-dashed line is a region that is irradiated with projection light by the projection portion 1 in the projection target object 6. In the example illustrated in FIG. 1, the projection range 11 is rectangular. The projection range 11 is a part or the entirety of a projectable range in which the projection can be performed by the projection portion 1.

Figure 3:
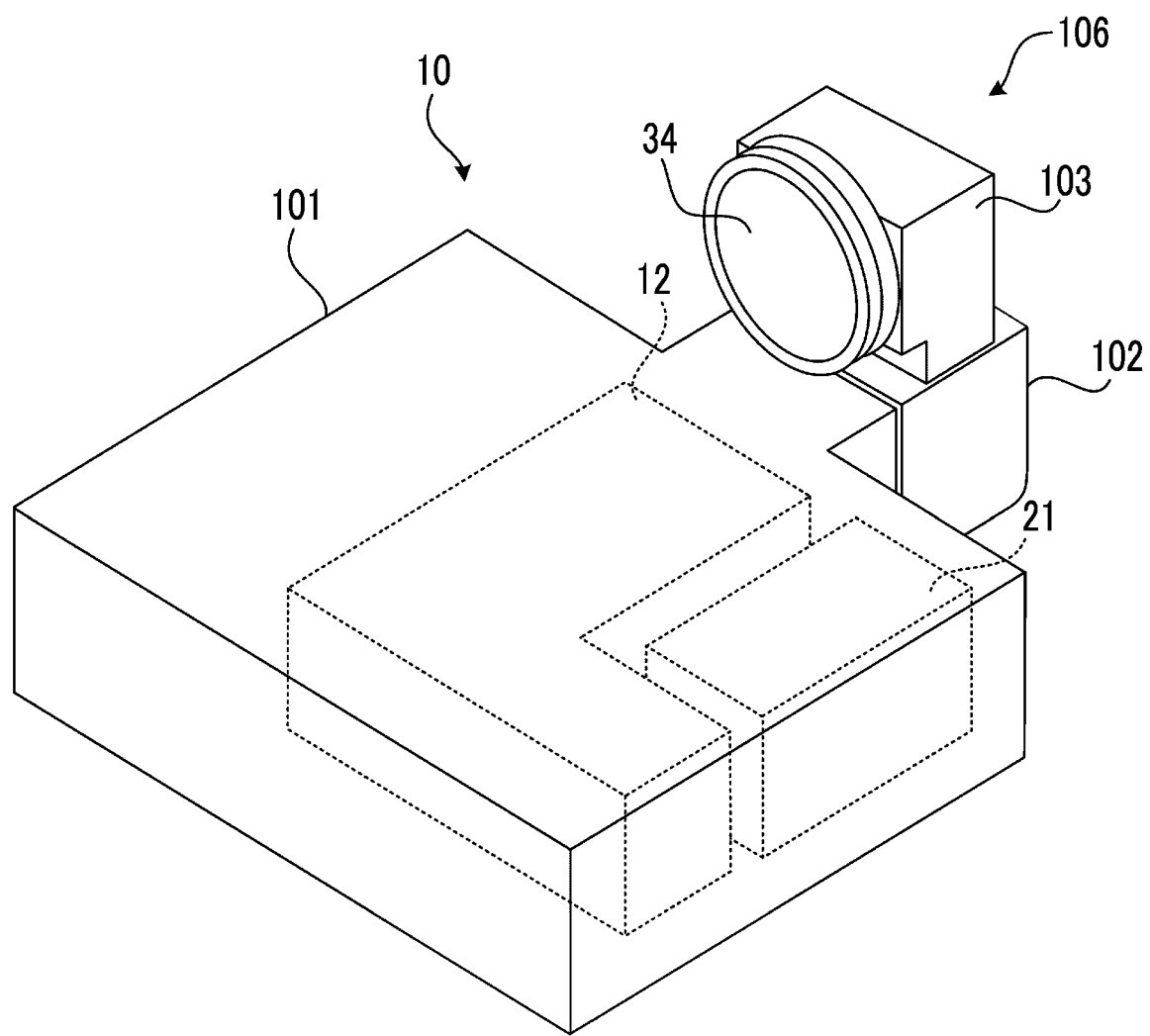
FIG. 3 is a schematic diagram illustrating an exterior configuration of the projection apparatus 10.
Figure 4:
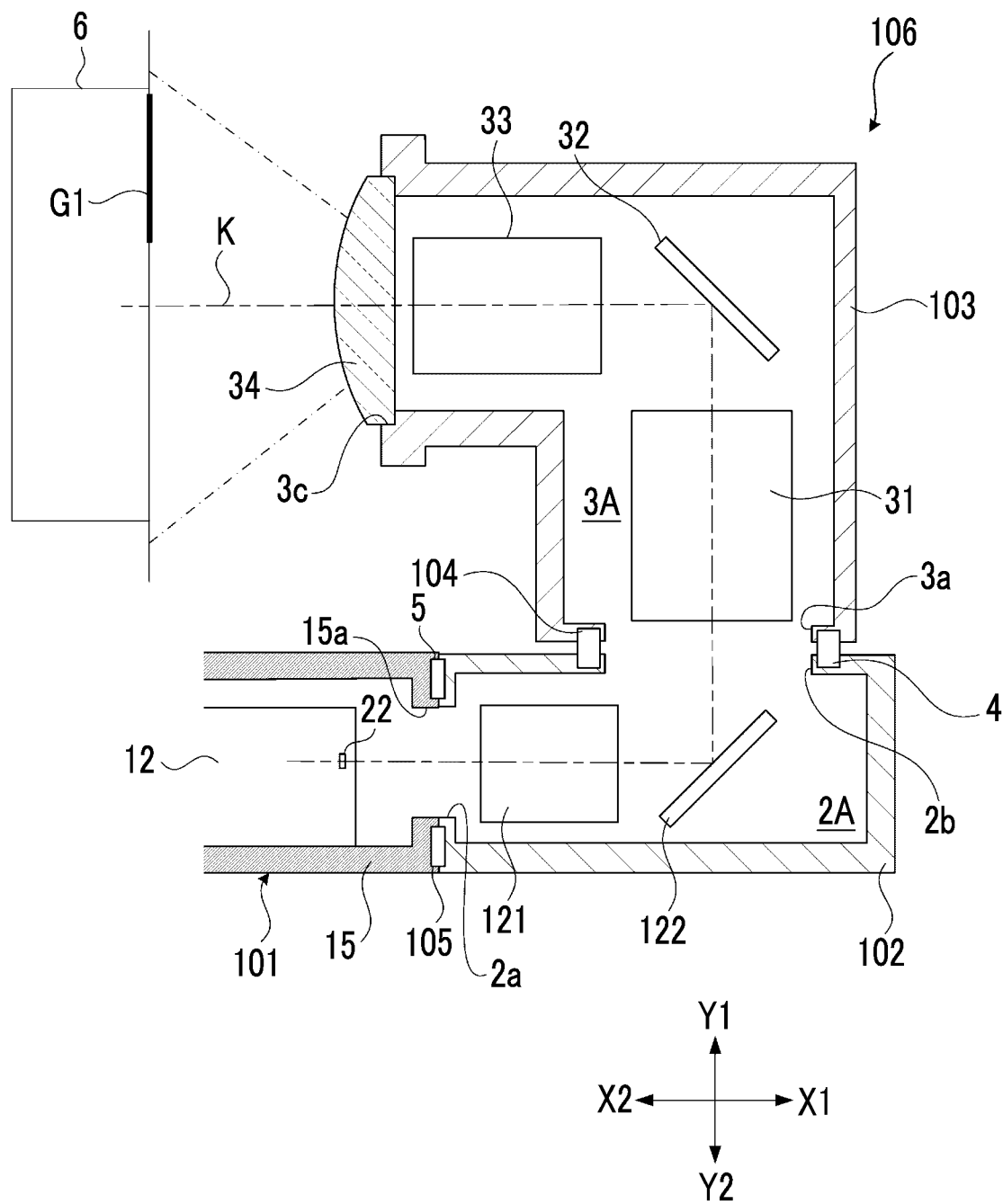
FIG. 4 is a schematic cross-sectional view of an optical unit 106 of the projection apparatus 10 illustrated in FIG. 3.

The projection portion 1, the control device 4, and the operation reception portion 2 are implemented by, for example, one device (for example, refer to FIG. 3 and FIG. 4). Alternatively, the projection portion 1, the control device 4, and the operation reception portion 2 may be separate devices that cooperate by communicating with each other.

Internal Configuration of Projection Portion 1 Illustrated in FIG. 1

Figure 2:
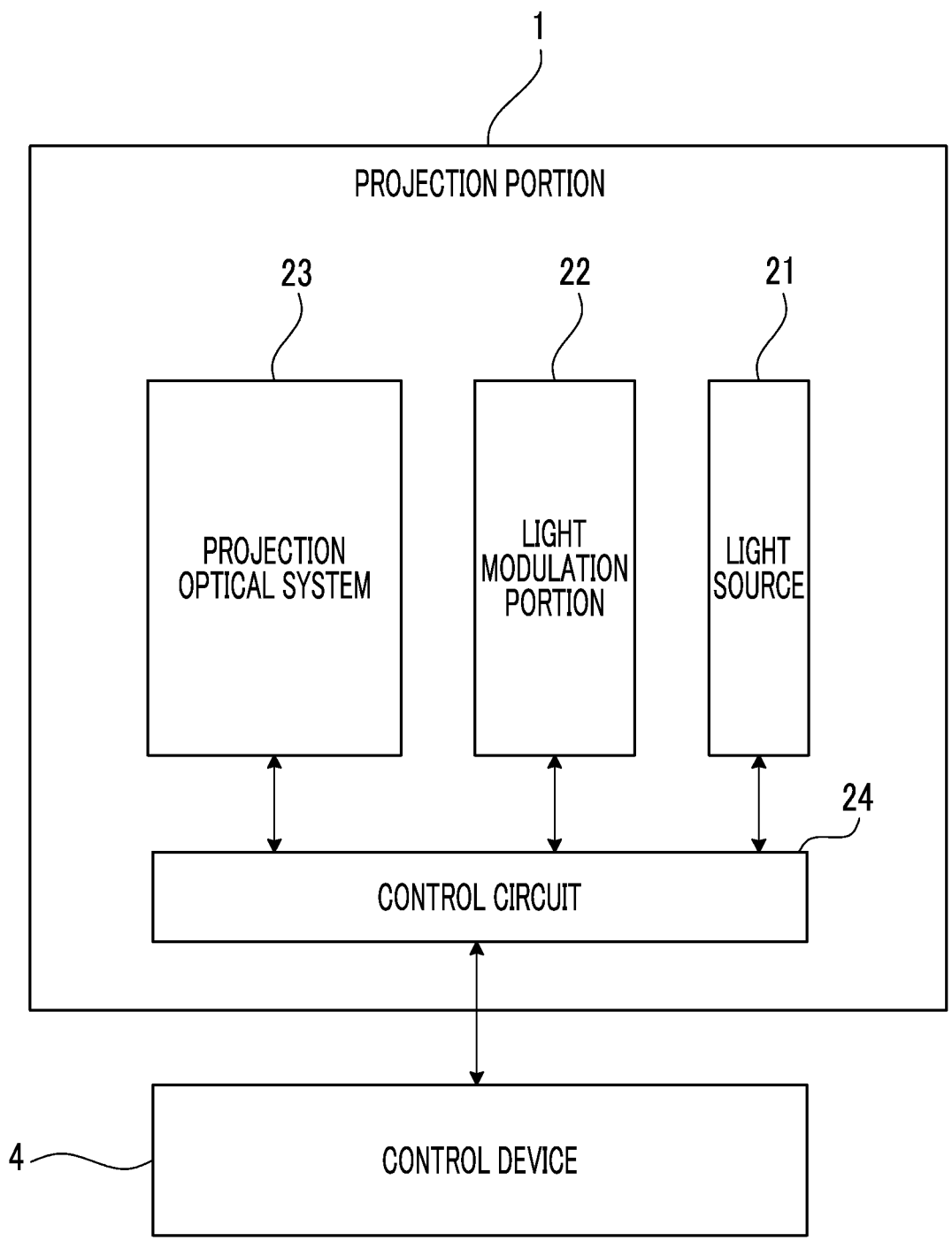
FIG. 2 is a schematic diagram illustrating an example of an internal configuration of a projection portion 1 illustrated in FIG. 1.

FIG. 2 is a schematic diagram illustrating an example of an internal configuration of the projection portion 1 illustrated in FIG. 1.

As illustrated in FIG. 2, the projection portion 1 comprises a light source 21, a light modulation portion 22, a projection optical system 23, and a control circuit 24.

The light source 21 includes a light emitting element such as a laser or a light emitting diode (LED) and emits, for example, white light.

The light modulation portion 22 is configured with three liquid crystal panels that emit each color image by modulating, based on image information, each color light which is emitted from the light source 21 and is separated into three colors of red, blue, and green by a color separation mechanism, not illustrated. Filters of red, blue, and green may be mounted in each of the three liquid crystal panels, and each color image may be emitted by modulating the white light emitted from the light source 21 in each liquid crystal panel.

The light from the light source 21 and the light modulation portion 22 is incident on the projection optical system 23. The projection optical system 23 includes at least one lens and is composed of, for example, a relay optical system. The light that has passed through the projection optical system 23 is projected to the projection target object 6.

In the projection target object 6, a region irradiated with the light transmitted through the entire range of the light modulation portion 22 is the projectable range in which the projection can be performed by the projection portion 1. In the projectable range, a region irradiated with the light actually transmitted through the light modulation portion 22 is the projection range 11. For example, in the projectable range, a size, a position, and a shape of the projection range 11 are changed by controlling a size, a position, and a shape of a region through which the light is transmitted in the light modulation portion 22.

The control circuit 24 projects an image based on display data to the projection target object 6 by controlling the light source 21, the light modulation portion 22, and the projection optical system 23 based on the display data input from the control device 4. The display data input into the control circuit 24 is configured with three constituents of red display data, blue display data, and green display data.

In addition, the control circuit 24 enlarges or reduces the projection range 11 (refer to FIG. 1) of the projection portion 1 by changing the projection optical system 23 based on an instruction input from the control device 4. In addition, the control device 4 may move the projection range 11 of the projection portion 1 by changing the projection optical system 23 based on the operation received by the operation reception portion 2 from the user.

In addition, the projection apparatus 10 comprises a shift mechanism that mechanically or optically moves the projection range 11 while maintaining an image circle of the projection optical system 23. The image circle of the projection optical system 23 is a region in which the projection light incident on the projection optical system 23 appropriately passes through the projection optical system 23 in terms of a light fall-off, color separation, edge part curvature, or the like.

The shift mechanism is implemented by at least any of an optical system shift mechanism that performs optical system shifting, or an electronic shift mechanism that performs electronic shifting.

The optical system shift mechanism is, for example, a mechanism (for example, refer to FIG. 3 and FIG. 4) that moves the projection optical system 23 in a direction perpendicular to an optical axis, or a mechanism that moves the light modulation portion 22 in the direction perpendicular to the optical axis instead of moving the projection optical system 23. In addition, the optical system shift mechanism may perform the movement of the projection optical system 23 and the movement of the light modulation portion 22 in combination with each other.

The electronic shift mechanism is a mechanism that performs pseudo shifting of the projection range 11 by changing a range through which the light is transmitted in the light modulation portion 22.

In addition, the projection apparatus 10 may comprise a projection direction changing mechanism that moves the image circle of the projection optical system 23 and the projection range 11. The projection direction changing mechanism is a mechanism that changes a projection direction of the projection portion 1 by changing a direction of the projection portion 1 by mechanical rotation (for example, refer to FIG. 3 and FIG. 4).

Mechanical Configuration of Projection Apparatus 10

FIG. 3 is a schematic diagram illustrating an exterior configuration of the projection apparatus 10. FIG. 4 is a schematic cross-sectional view of an optical unit 106 of the projection apparatus 10 illustrated in FIG. 3. FIG. 4 illustrates a cross section in a plane along an optical path of the light emitted from a body part 101 illustrated in FIG. 3.

As illustrated in FIG. 3, the projection apparatus 10 comprises the body part 101 and the optical unit 106 that is provided to protrude from the body part 101. In the configuration illustrated in FIG. 3, the operation reception portion 2; the control device 4; and the light source 21, the light modulation portion 22, and the control circuit 24 in the projection portion 1 are provided in the body part 101. The projection optical system 23 in the projection portion 1 is provided in the optical unit 106.

The optical unit 106 comprises a first member 102 supported by the body part 101 and a second member 103 supported by the first member 102.

The first member 102 and the second member 103 may be an integrated member. The optical unit 106 may be configured to be attachable to and detachable from the body part 101 (in other words, interchangeably configured).

The body part 101 includes a housing 15 (refer to FIG. 4) in which an opening 15a (refer to FIG. 4) for passing light is formed in a part connected to the optical unit 106.

As illustrated in FIG. 3, the light source 21 and a light modulation unit 12 including the light modulation portion 22 (refer to FIG. 2) that generates an image by spatially modulating the light emitted from the light source 21 based on input image data are provided inside the housing 15 of the body part 101.

The light emitted from the light source 21 is incident on the light modulation portion 22 of the light modulation unit 12 and is spatially modulated and emitted by the light modulation portion 22.

As illustrated in FIG. 4, the image formed by the light spatially modulated by the light modulation unit 12 is incident on the optical unit 106 by passing through the opening 15a of the housing 15 and is projected to the projection target object 6 as a projection target object. Accordingly, an image G1 is visible from an observer.

As illustrated in FIG. 4, the optical unit 106 comprises the first member 102 including a hollow portion 2A connected to the inside of the body part 101; the second member 103 including a hollow portion 3A connected to the hollow portion 2A, a first optical system 121 and a reflective member 122 disposed in the hollow portion 2A; a second optical system 31, a reflective member 32, a third optical system 33, and a lens 34 disposed in the hollow portion 3A; a shift mechanism 105; and a projection direction changing mechanism 104.

The first member 102 is a member having, for example, a rectangular cross-sectional exterior shape, in which an opening 2a and an opening 2b are formed in surfaces perpendicular to each other. The first member 102 is supported by the body part 101 in a state where the opening 2a is disposed at a position facing the opening 15a of the body part 101. The light emitted from the light modulation portion 22 of the light modulation unit 12 of the body part 101 is incident into the hollow portion 2A of the first member 102 through the opening 15a and through the opening 2a.

An incidence direction of the light incident into the hollow portion 2A from the body part 101 will be referred to as a direction X1. A direction opposite to the direction X1 will be referred to as a direction X2. The direction X1 and the direction X2 will be collectively referred to as a direction X. In addition, a direction from the front to the back of the page of FIG. 4 and a direction opposite thereto will be referred to as a direction Z. In the direction Z, the direction from the front to the back of the page will be referred to as a direction Z1, and the direction from the back to the front of the page will be referred to as a direction Z2.

In addition, a direction perpendicular to the direction X and to the direction Z will be referred to as a direction Y. In the direction Y, an upward direction in FIG. 4 will be referred to as a direction Y1, and a downward direction in FIG. 4 will be referred to as a direction Y2. In the example in FIG. 4, the projection apparatus 10 is disposed such that the direction Y2 is a vertical direction.

The projection optical system 23 illustrated in FIG. 2 is composed of the first optical system 121, the reflective member 122, the second optical system 31, the reflective member 32, the third optical system 33, and the lens 34. An optical axis K of the projection optical system 23 is illustrated in FIG. 4. The first optical system 121, the reflective member 122, the second optical system 31, the reflective member 32, the third optical system 33, and the lens 34 are disposed in this order from the light modulation portion 22 side along the optical axis K.

The first optical system 121 includes at least one lens and guides the light that is incident on the first member 102 from the body part 101 and that travels in the direction X1, to the reflective member 122.

The reflective member 122 reflects the light incident from the first optical system 121 in the direction Y1. The reflective member 122 is configured with, for example, a mirror. In the first member 102, the opening 2b is formed on the optical path of the light reflected by the reflective member 122, and the reflected light travels to the hollow portion 3A of the second member 103 by passing through the opening 2b.

The second member 103 is a member having an approximately T-shaped cross-sectional exterior shape, in which an opening 3a is formed at a position facing the opening 2b of the first member 102. The light that has passed through the opening 2b of the first member 102 from the body part 101 is incident into the hollow portion 3A of the second member 103 through the opening 3a. Cross-sectional exterior shapes of the first member 102 and the second member 103 are arbitrary and are not limited to the above.

The second optical system 31 includes at least one lens and guides the light incident from the first member 102 to the reflective member 32.

The reflective member 32 guides the light incident from the second optical system 31 to the third optical system 33 by reflecting the light in the direction X2. The reflective member 32 is configured with, for example, a mirror.

The third optical system 33 includes at least one lens and guides the light reflected by the reflective member 32 to the lens 34.

The lens 34 is disposed in an end part of the second member 103 on the direction X2 side in the form of closing the opening 3c formed in this end part. The lens 34 projects the light incident from the third optical system 33 to the projection target object 6.

The projection direction changing mechanism 104 is a rotation mechanism that rotatably connects the second member 103 to the first member 102. By the projection direction changing mechanism 104, the second member 103 is configured to be rotatable about a rotation axis (specifically, the optical axis K) that extends in the direction Y. The projection direction changing mechanism 104 is not limited to a disposition position illustrated in FIG. 4 as long as the projection direction changing mechanism 104 can rotate the optical system. In addition, the number of rotation mechanisms is not limited to one, and a plurality of rotation mechanisms may be provided.

The shift mechanism 105 is a mechanism for moving the optical axis K of the projection optical system (in other words, the optical unit 106) in a direction (direction Y in FIG. 4) perpendicular to the optical axis K. Specifically, the shift mechanism 105 is configured to be capable of changing a position of the first member 102 in the direction Y with respect to the body part 101. The shift mechanism 105 may manually move the first member 102 or electrically move the first member 102.

FIG. 4 illustrates a state where the first member 102 is moved as far as possible to the direction Y1 side by the shift mechanism 105. By moving the first member 102 in the direction Y2 via the shift mechanism 105 from the state illustrated in FIG. 4, a relative position between a center of the image (in other words, a center of a display surface) formed by the light modulation portion 22 and the optical axis K changes, and the image G1 projected to the projection target object 6 can be shifted (translated) in the direction Y2.

The shift mechanism 105 may be a mechanism that moves the light modulation portion 22 in the direction Y instead of moving the optical unit 106 in the direction Y. Even in this case, the image G1 projected to the projection target object 6 can be moved in the direction Y2.

Projection of Operation Image by Control Device 4 of Embodiment 1

Figure 5:
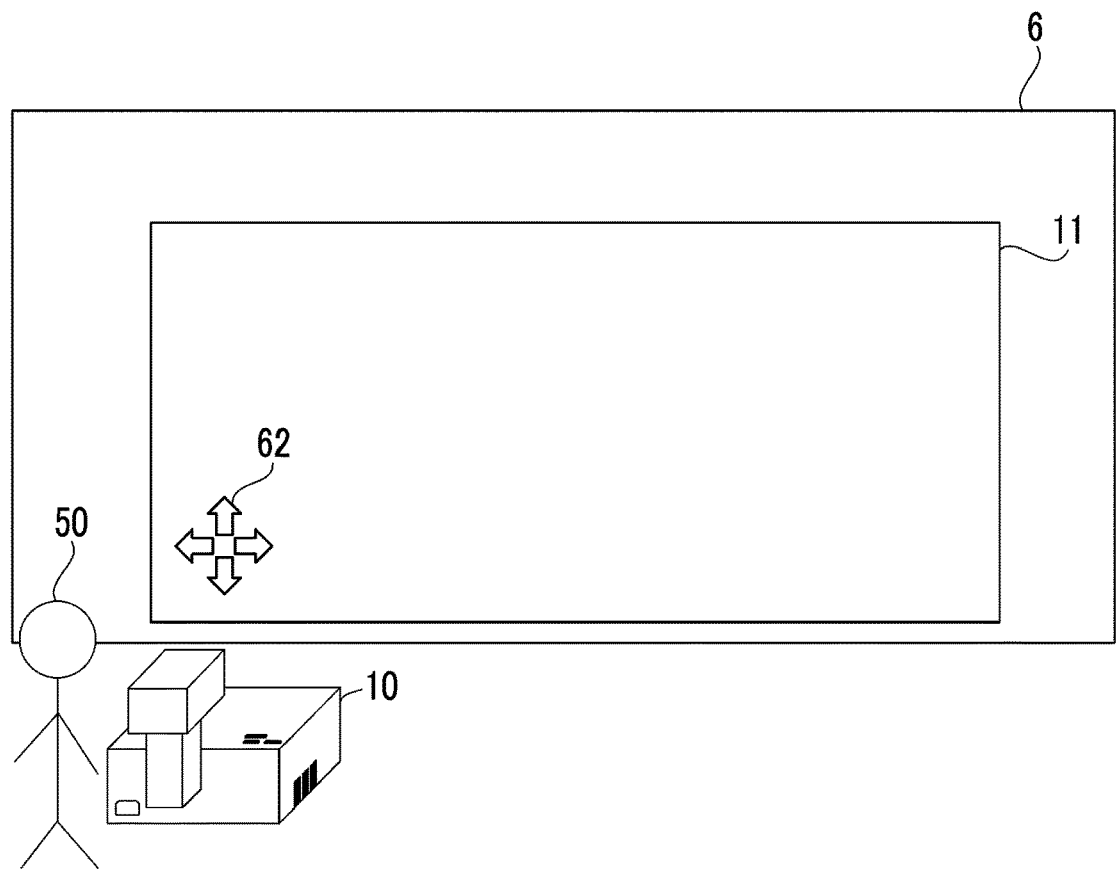
FIG. 5 is a diagram illustrating an example of projection of an operation image by a control device 4 of Embodiment 1.

FIG. 5 is a diagram illustrating an example of projection of the operation image by the control device 4 of Embodiment 1. In the example in FIG. 5, a lens having a short focal length is used in the projection optical system 23 of the projection apparatus 10, and the projection apparatus 10 is installed close to the projection target object 6. In addition, the projection apparatus 10 is installed near a left end of the projection range 11 in a direction of the projection target object 6.

An operator 8 is the user who operates the projection apparatus 10, and is positioned close to the projection apparatus 10. Accordingly, the operator 8 is also positioned near the left end of the projection range 11 in the direction of the projection target object 6 like the projection apparatus 10.

The operation image 62 is an image for operating the projection apparatus 10. For example, the operation image 62 is an image for operating the projection range 11 of the projection apparatus 10 in the projection target object 6. Examples of the operation of the projection range 11 include shifting of the projection range 11 using the shift mechanism, enlarging and reducing of the projection range 11, and distortion correction of the projection range 11.

In the example illustrated in FIG. 5, the operation image 62 includes upward, downward, leftward, and rightward cursor key images. For example, the operation image 62 is an image resembling upward, downward, leftward, and rightward cursor keys provided in the projection apparatus 10 (body part 101) as the operation reception portion 2, and provides the operator 8 with guidance indicating that the projection range 11 can be operated by pressing the cursor keys of the projection apparatus 10. For example, in a case where the operator 8 performs an operation of pressing the rightward cursor key included in the operation reception portion 2 in the state in FIG. 5, the projection apparatus 10 performs a control of shifting the projection range 11 to the right using the shift mechanism.

Alternatively, the operation image 62 may provide the operator 8 with guidance about an interactive operation in which the projection range 11 can be operated by performing an operation of providing an instruction for the operation image 62 in the projection image. For example, in a case where the operator 8 performs an operation of providing an instruction for the rightward cursor key of the operation image 62 in the projection image, the projection apparatus 10 performs a control of shifting the projection range 11 to the right using the shift mechanism.

As a method in which the projection apparatus 10 detects the operation of providing the instruction to the operation image 62 in the projection image, for example, a method in which the operator 8 provides the instruction using an indicator including a sensor that can detect an instruction position in the projection image, and in which the projection apparatus 10 acquires the instruction from the indicator can be used.

Alternatively, as a method in which the projection apparatus 10 detects the operation of providing the instruction for the operation image 62 in the projection image, a method of using an imaging apparatus that images the projection target object 6, and of detecting the instruction provided by the operator 8 by performing image recognition based on a captured image obtained by imaging of the imaging apparatus may be used.

As illustrated in FIG. 5, the control device 4 projects the operation image 62 to near the left end of the projection range 11 in the direction of the projection target object 6, that is, a position close to the operator 8, in the projection range 11. Accordingly, control of the projection apparatus 10 using the operation image 62 is facilitated for the operator 8. For example, the operation image 62 is easily visible to the operator 8. In addition, in a case where the operation image 62 provides the operator 8 with guidance about the interactive operation as described above, it is easy for the operator 8 to perform the operation of providing the instruction for the operation image 62.

Processing in which the control device 4 determines a projection position of the operation image 62 in the projection range 11 will be described. Here, it is assumed that the operator 8 performs a first operation on the operation reception portion 2. The first operation is an operation that does not explicitly provide the control device 4 with an instruction of the projection position of the operation image 62 in the projection range 11. For example, the first operation is an operation of pressing a power button included in the operation reception portion 2 or of providing the control device 4 with an instruction to project the operation image 62.

In a case where the first operation is performed on the operation reception portion 2, the control device 4 determines the projection position of the operation image 62 in the projection range 11 based on second information different from first information obtained by the first operation.

For example, in a case where the first operation is operation of the power button, the first information obtained by the first operation is information indicating that an instruction to power the projection apparatus 10 ON is provided. In addition, in a case where the first operation is the operation of providing the instruction to project the operation image 62, the first information obtained by the first operation is information indicating that an instruction to project the operation image 62 is provided.

The second information used for the control device 4 to determine the projection position of the operation image 62 in the projection range 11 is information different from the first information. In other words, the second information is information that cannot be obtained by only the first operation. In addition, the second information does not explicitly indicate the projection position of the operation image 62 of which the instruction is provided by the operator 8.

Specifically, the second information is information indicating a positional relationship between the projection apparatus 10 (that is, the operation reception portion 2) and the projection range 11. For example, in the example in FIG. 5, information indicating the positional relationship between the projection apparatus 10 and the projection range 11 is information indicating that the projection apparatus 10 is installed near the left end of the projection range 11 in the direction of the projection target object 6. In addition, the information indicating the positional relationship between the projection apparatus 10 and the projection range 11 is not limited thereto and may be, for example, information indicating a direction and an amount of movement from a center or an end part of the projection target object 6 to a location at which the projection apparatus 10 is positioned.

For example, in a case where the projection apparatus 10 is installed in the direction of the projection target object 6, the second information is set by a manual input into the projection apparatus 10 and is stored in the storage medium 4a. In addition, the second information may be set independently of a manual input, that is, automatically (refer to FIG. 6).

The control device 4, based on the second information indicating the positional relationship between the projection apparatus 10 and the projection range 11, performs a control of projecting the operation image 62 to a part closest to the projection apparatus 10 (operation reception portion 2) among a plurality of parts included in the projection range 11.

As an example, the projection range 11 will be described as being divided into two parts of left and right parts. As in the example in FIG. 5, in a case where the second information indicates that the projection apparatus 10 is installed near the left end of the projection range 11 in the direction of the projection target object 6, the control device 4 controls the projection portion 1 to project the operation image 62 to the left part out of the left and right parts of the projection range 11.

While the projection range 11 has been described as being divided into two parts of the left and right parts, the projection range 11 may be divided into three or more parts, and the control device 4 may perform a control of projecting the operation image 62 to a part closest to the projection apparatus 10 among the three or more parts of the projection range 11 based on the positional relationship between the projection apparatus 10 and the projection range 11 indicated by the second information. In addition, division of the projection range 11 may be not only division in a left-right direction but also division in a vertical direction or division into a matrix.

Automatic Setting of Second Information

Figure 6:
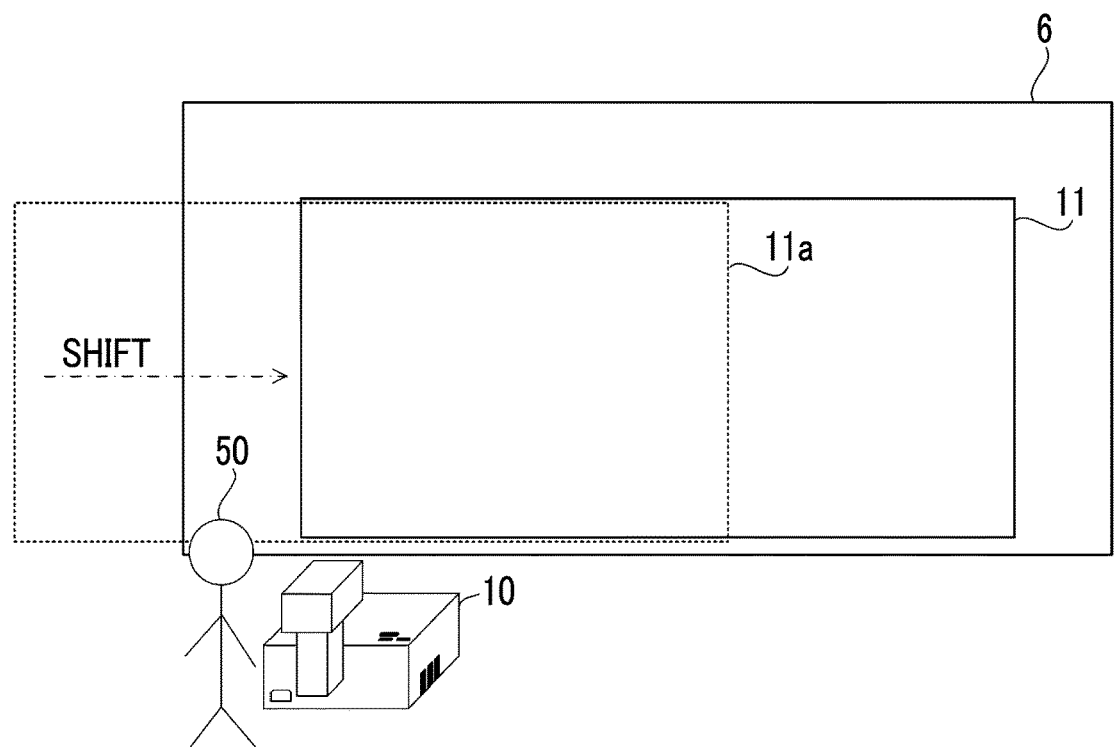
FIG. 6 is a diagram illustrating an example of automatic setting of second information.

FIG. 6 is a diagram illustrating an example of automatic setting of the second information. For example, the second information is automatically set based on a result of a projection control of changing the positional relationship between the projection apparatus 10 and the projection range 11, and is stored in the storage medium 4a.

For example, in a case where the projection apparatus 10 is installed, the projection apparatus 10 is in a state of performing projection toward the front of the projection apparatus 10. That is, in a case where the projection apparatus 10 is installed, the projection range 11 is in front of the projection apparatus 10. A projection range 11a illustrated by a broken line in FIG. 6 indicates the projection range 11 in a case where the projection apparatus 10 is installed.

After the projection apparatus 10 is installed, it is assumed that the control device 4 performs a projection control of shifting the projection range 11 to the right in the direction of the projection target object 6 using the shift mechanism (the optical system shift mechanism or the electronic shift mechanism). In a case where such a projection control is performed, the projection apparatus 10 is in a state of being positioned near the left end of the projection range 11 in the direction of the projection target object 6 as in the example in FIG. 5. In this case, the control device 4 stores a history of the projection control (shifting) in the storage medium 4a as the second information. Accordingly, the second information indicating the positional relationship between the projection apparatus 10 and the projection range 11 can be stored.

Alternatively, after the projection apparatus 10 is installed, it is assumed that the control device 4 performs a projection control of changing the projection direction of the projection portion 1 to the right from the front using the projection direction changing mechanism 104. Even in a case where such a projection control is performed, the projection apparatus 10 is in a state of being positioned near the left end of the projection range 11 in the direction of the projection target object 6 as in the example in FIG. 5. In this case, the control device 4 stores a history of the projection control (changing of the projection direction) in the storage medium 4a as the second information. Accordingly, the second information indicating the positional relationship between the projection apparatus 10 and the projection range 11 can be stored.

As described using FIG. 6, the projection apparatus 10 can perform the projection control (for example, shifting or changing of the projection direction) of changing the positional relationship between the projection apparatus 10 and the projection range 11. The control device 4 determines the projection position of the operation image 62 in the projection range 11 based on the second information depending on the projection control. Accordingly, even in a case where the second information is not set by a manual input into the projection apparatus 10, it is possible to automatically set the second information and to determine the projection position of the operation image 62 in the projection range 11.

Processing Performed by Control Device 4 of Embodiment 1

Figure 7:
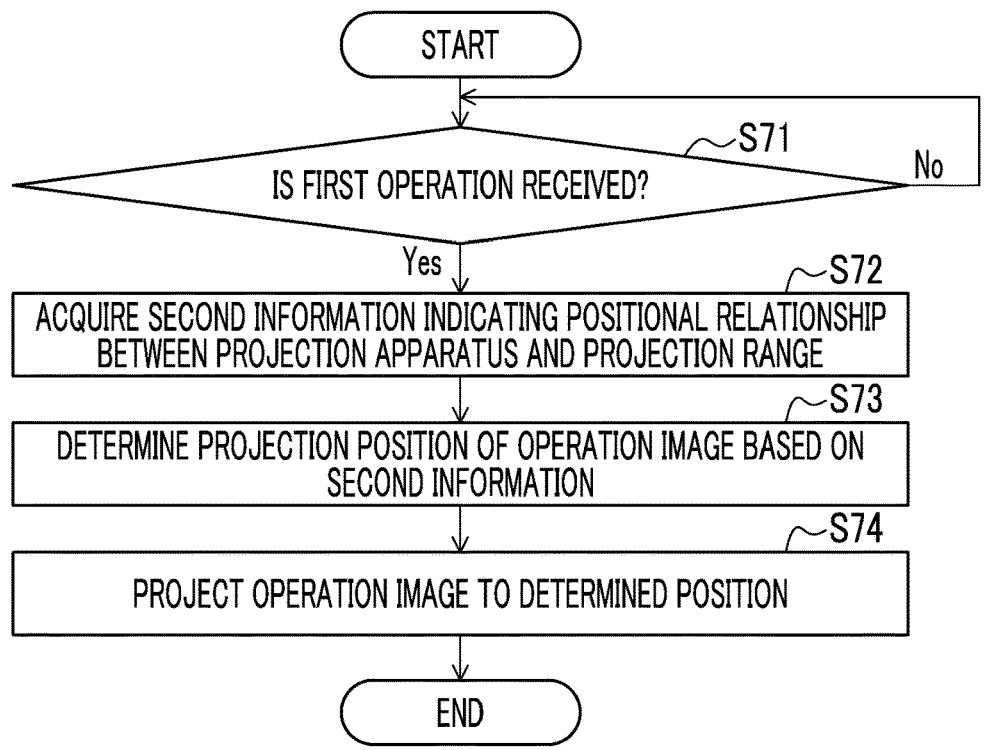
FIG. 7 is a flowchart illustrating an example of processing performed by the control device 4 of Embodiment 1.

FIG. 7 is a flowchart illustrating an example of processing performed by the control device 4 of Embodiment 1. First, the control device 4 determines whether or not the operation reception portion 2 has received the first operation (for example, the operation of powering ON) from the operator 8 (step S71), and waits until the operation reception portion 2 receives the first operation from the operator 8 (step S71: No loop).

In step S71, in a case where the operation reception portion 2 receives the first operation from the operator 8 (step S71: Yes), the control device 4 acquires the second information that is different from the first information obtained by the received first operation and that indicates the positional relationship between the projection apparatus 10 and the projection range 11 (step S72).

Next, the control device 4 determines the projection position of the operation image 62 in the projection range 11 based on the acquired second information (step S73). Next, the control device 4 performs a control of projecting the operation image 62 from the projection portion 1 to the determined position (a position close to the projection apparatus 10) (step S74), and ends the series of processing.

Accordingly, in accordance with the operation of the operation reception portion 2 (operation portion) for operating the projection apparatus 10, the control device 4 performs a control of projecting the operation image 62 from the projection portion 1 to a part determined based on the second information, which is different from the first information obtained by the first operation performed on the operation reception portion 2, in the projection range 11 of the projection apparatus 10.

Accordingly, even in a case where the operator 8 does not explicitly provide the projection apparatus 10 with the instruction of the projection position of the operation image 62, the operation image 62 can be projected in a state where it is possible to estimate that the operator 8 who has performed the first operation is close to the projection apparatus 10.

Accordingly, by projecting the operation image 62 to a position close to the operation reception portion 2 (projection apparatus 10) in the projection range 11, the operation image 62 can be projected to a position close to the operator 8. Thus, control of the projection apparatus 10 by the operator 8 using the operation image 62 is facilitated. In addition, even in a case where a positional relationship between the projection range 11 and the operator 8 is not determined using the imaging apparatus or the like, the positional relationship between the projection range 11 and the projection apparatus 10 may be determined. Thus, determination is facilitated.

Maintaining of Projection Position of Operation Image 62

Figure 8:
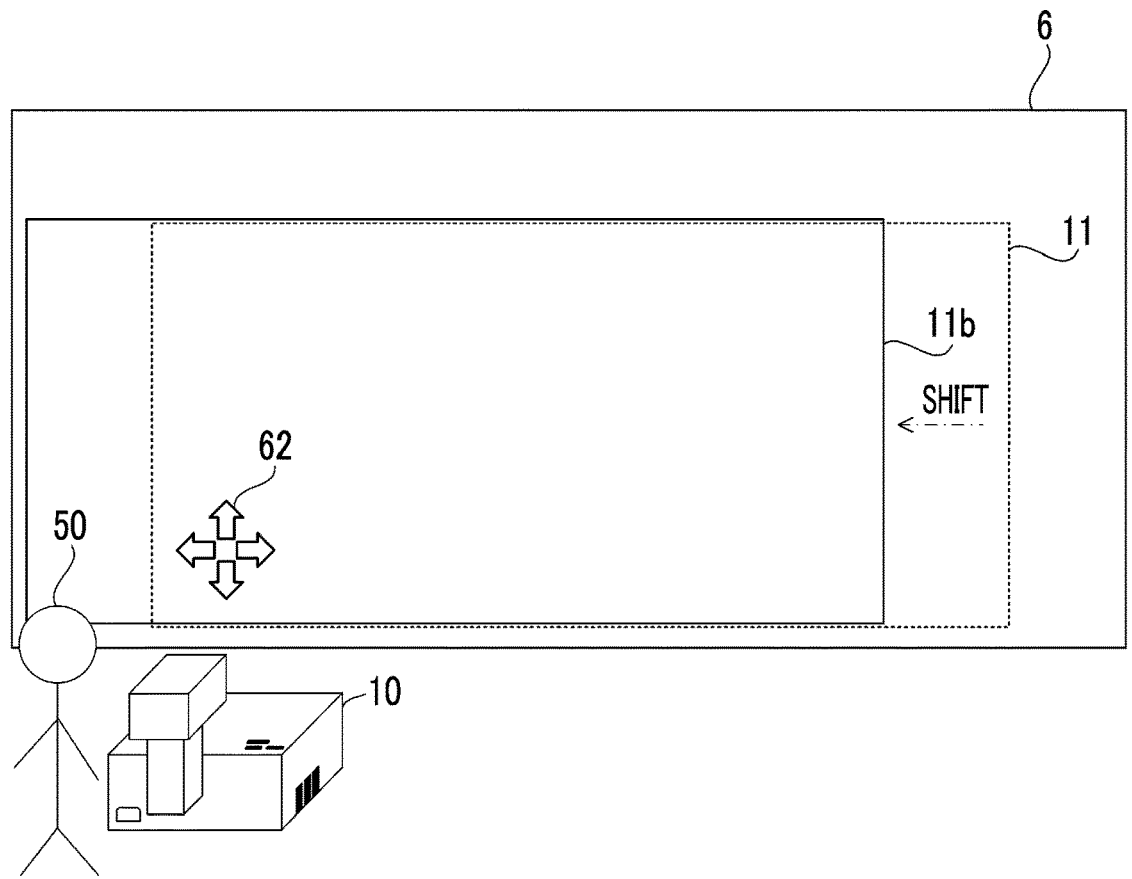
FIG. 8 is a diagram illustrating an example of maintaining of a projection position of an operation image 62.

FIG. 8 is a diagram illustrating an example of maintaining of the projection position of the operation image 62. For example, after the state illustrated in FIG. 5, it is assumed that a projection control of shifting the projection range 11 to the left in the direction of the projection target object 6 as illustrated in FIG. 8 using the shift mechanism (the optical system shift mechanism or the electronic shift mechanism) is performed. A projection range 11b in FIG. 8 indicates the projection range 11 after this shifting.

In response to such a change in the positional relationship between the projection apparatus 10 and the projection range 11, the control device 4 performs a control of maintaining the projection position of the operation image 62 in the projection target object 6. For example, after the operation image 62 is projected by the processing illustrated in FIG. 7, the control device 4 repeatedly executes steps S72 to S74 illustrated in FIG. 7. In addition, as described above, it is assumed that the second information is the history of the projection control of shifting the projection range 11.

In this case, in a case where the control device 4 shifts the projection range 11, the second information acquired in step S72 also changes. Consequently, the positional relationship between the projection apparatus 10 and the projection range 11 determined in step S73 also changes. Accordingly, the position to which the operation image 62 is projected in step S74 also changes, and the projection position of the operation image 62 in the projection target object 6 is maintained. Thus, even in a case where the projection range 11 is shifted, it is possible to continue projecting the operation image 62 close to the projection apparatus 10, that is, close to the operator 8.

Embodiment 2

Parts of Embodiment 2 different from Embodiment 1 will be described. While a configuration in which the operation portion that receives the first operation is provided in the projection apparatus 10 (body part 101) has been described in Embodiment 1, a case where the operation portion that receives the first operation is a controller with which the projection apparatus 10 can be remotely operated will be described in Embodiment 2.

Projection of Operation Image by Control Device 4 of Embodiment 2

Figure 9:
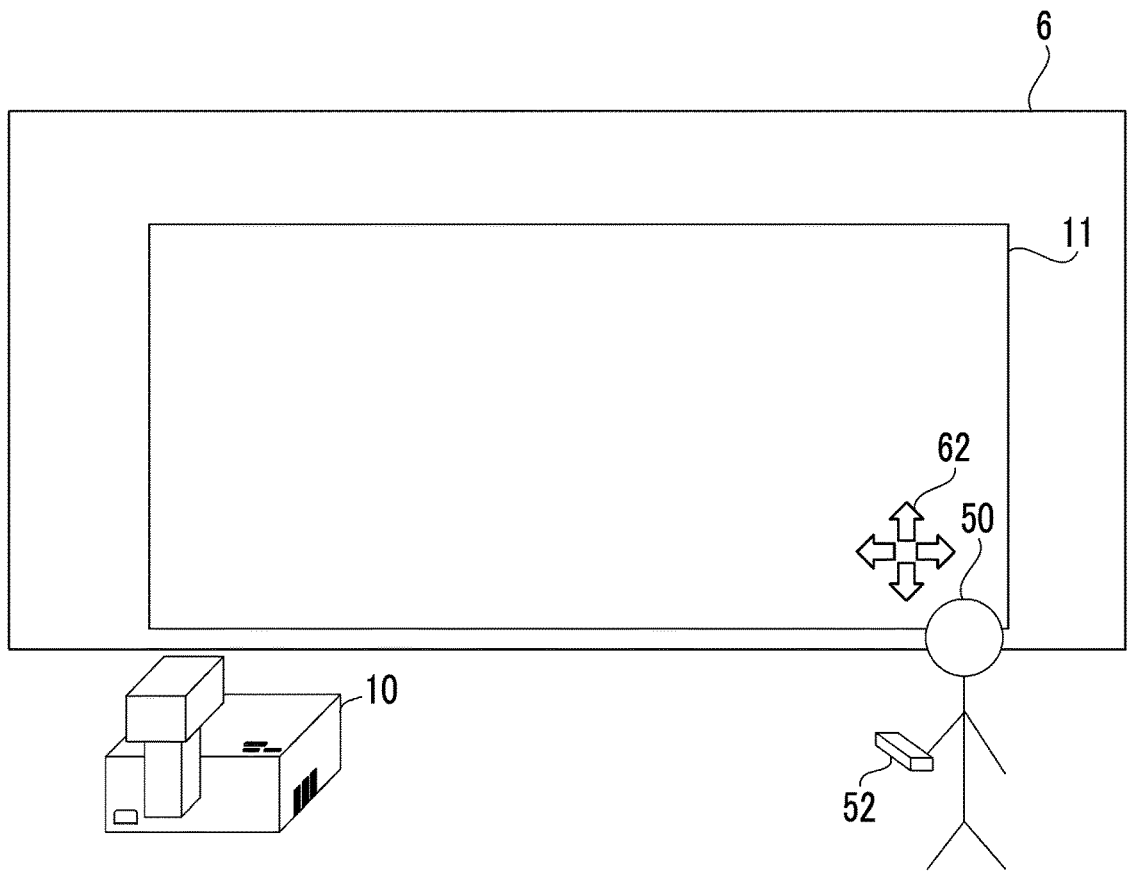
FIG. 9 is a diagram illustrating an example of projection of an operation image by the control device 4 of Embodiment 2.

FIG. 9 is a diagram illustrating an example of projection of the operation image by the control device 4 of Embodiment 2. In the example in FIG. 9, the operator 8 holds a controller 52 and is positioned near a right end of the projection range 11 in the direction of the projection target object 6. The controller 52 is a remote controller with which the projection apparatus 10 can be remotely operated.

The controller 52 includes a sensor that can detect movement of the controller 52. The detection of the movement of the instruction position includes detection of a movement direction of the instruction position and detection of a movement amount of the instruction position. This sensor includes, for example, an acceleration sensor that can measure three-dimensional acceleration.

The operator 8 can perform the first operation on the controller 52. As described above, the first operation is an operation that does not explicitly provide the control device 4 with the instruction of the projection position of the operation image 62 in the projection range 11. For example, the first operation is pressing a power button of the controller 52 for powering the projection apparatus 10 ON or is pressing a button of the controller 52 for providing the projection apparatus 10 with the instruction to project the operation image 62. In addition, the first operation performed on the controller 52 can be various operations such as an operation of raising the controller 52 or an operation of moving the controller 52.

The controller 52 can communicate with the operation reception portion 2 of the control device 4 by wireless communication such as short range wireless communication and transmits information to the control device 4 by wireless communication with the operation reception portion 2. For example, the controller 52 transmits detection information indicating a detection result of the sensor to the control device 4. In addition, the controller 52 transmits information indicating a reception result of the first operation to the control device 4.

For example, the controller 52 transmits the detection information indicating the detection result of the sensor to the control device 4 in constant periods, and transmits the reception result of the first operation to the control device 4 when the first operation is received.

Alternatively, the controller 52 may accumulate the detection result of the sensor and collectively transmit the accumulated detection result of the movement to the control device 4 together with the reception result of the first operation when the first operation is received. At this point, the controller 52 may transmit the entire accumulated detection result of the movement to the control device 4 or may transmit a result of calculating an integrating accumulation of the accumulated detection result of the movement to the control device 4.

The control device 4 can acquire the second information indicating a positional relationship between the controller 52 and the projection range 11 based on the detection information of the sensor of the controller 52. For example, even in a case where the projection apparatus 10 is operated using the controller 52, the operator 8 who operates the projection apparatus 10 first presses the power button of the projection apparatus 10 and then, holds and moves the controller 52.

Accordingly, for example, in a case where the controller 52 is moved to the right in the direction of the projection target object 6 as illustrated in FIG. 9 after power-ON of the projection apparatus 10 as a reference, the control device 4 can acquire, based on the detection result of the movement, the second information indicating that the controller 52 is positioned near the right end of the projection range 11 in the direction of the projection target object 6.

In addition, in acquiring the second information based on the detection information of the sensor of the controller 52, the control device 4 may further use information indicating the positional relationship between the projection apparatus 10 and the projection range 11. The information indicating the positional relationship between the projection apparatus 10 and the projection range 11 is the same information as the second information in Embodiment 1. Accordingly, the second information indicating the positional relationship between the controller 52 and the projection range 11 can be acquired by also taking the positional relationship between the projection apparatus 10 and the projection range 11, that is, an initial positional relationship between the controller 52 and the projection range 11, into consideration.

For example, in the example illustrated in FIG. 9, the information indicating the positional relationship between the projection apparatus 10 and the projection range 11 is information indicating that the projection apparatus 10 is positioned near the left end of the projection range 11 in the direction of the projection target object 6. As described above, this information may be set by a manual input into the projection apparatus 10 or may be automatically set based on the history of the projection control (shifting or changing of the projection direction) of the projection apparatus 10.

In a case where the first operation is performed on the controller 52, the control device 4 determines the projection position of the operation image 62 in the projection range 11 based on the second information different from the first information (for example, information indicating that the instruction to power ON or to project the operation image 62 is provided) obtained by the first operation. For example, the control device 4 determines, as the projection position of the operation image 62, a part closest to the controller 52 among the plurality of parts included in the projection range 11. The control device 4 performs a control of projecting the operation image 62 from the projection portion 1 to the determined projection position.

Processing Performed by Control Device 4 of Embodiment 2

Figure 10:
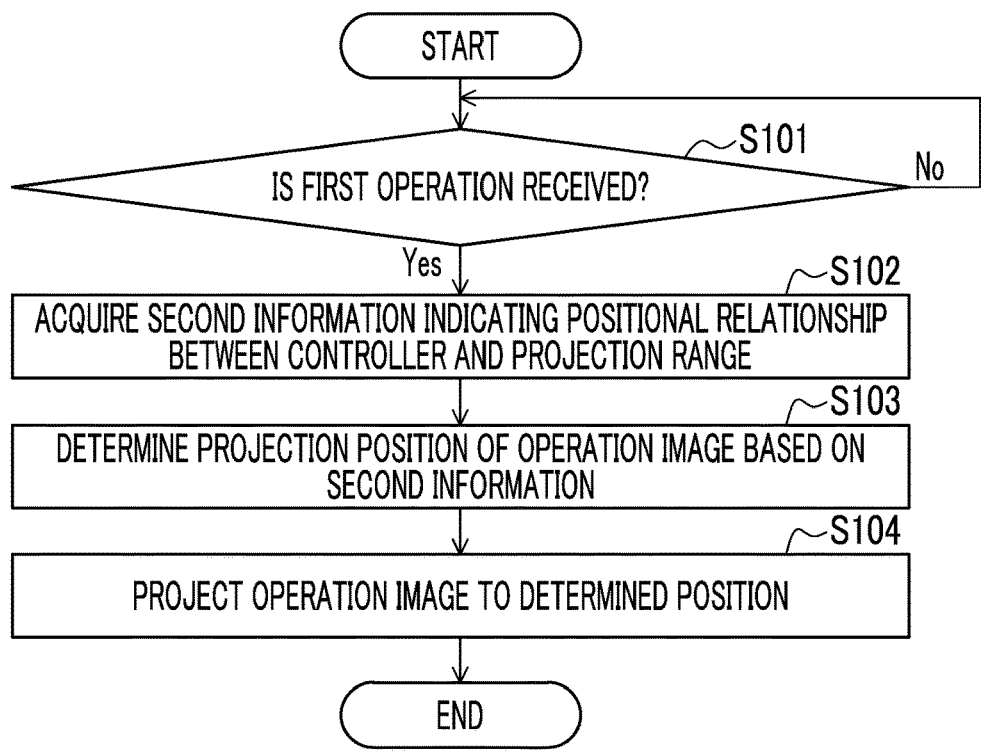
FIG. 10 is a flowchart illustrating an example of processing performed by the control device 4 of Embodiment 2.

FIG. 10 is a flowchart illustrating an example of processing performed by the control device 4 of Embodiment 2. First, the control device 4 determines whether or not the controller 52 has received the first operation (for example, the operation of powering ON) from the operator 8 (step S101), and waits until the controller 52 receives the first operation from the operator 8 (step S101: No loop).

In step S101, in a case where the controller 52 receives the first operation from the operator 8 (step S101: Yes), the control device 4 acquires the second information that is different from the first information obtained by the received first operation and that indicates the positional relationship between the controller 52 and the projection range 11 (step S102).

Next, the control device 4 determines the projection position of the operation image 62 in the projection range 11 based on the acquired second information (step S103). Next, the control device 4 performs a control of projecting the operation image 62 from the projection portion 1 to the determined projection position (a position close to the controller 52) (step S104), and ends the series of processing.

Accordingly, in accordance with the operation of the controller 52 (operation portion) for operating the projection apparatus 10, the control device 4 performs a control of projecting the operation image 62 from the projection portion 1 to a part determined based on the second information, which is different from the first information obtained by the first operation performed on the controller 52, in the projection range 11 of the projection apparatus 10.

Accordingly, even in a case where the operator 8 does not explicitly provide the projection apparatus 10 with the instruction of the projection position of the operation image 62, the operation image 62 can be projected in a state where it is possible to estimate that the operator 8 who has performed the first operation is close to the controller 52 (is holding the controller 52). Accordingly, by projecting the operation image 62 to a position close to the controller 52 in the projection range 11, the operation image 62 can be projected to a position close to the operator 8. Thus, control of the projection apparatus 10 by the operator 8 using the operation image 62 is facilitated. In addition, even in a case where the positional relationship between the projection range 11 and the operator 8 is not determined using the imaging apparatus or the like, the positional relationship between the projection range 11 and the controller 52 may be determined. Thus, determination is facilitated.

Maintaining of Projection Position of Operation Image 62

Even in Embodiment 2, in response to such a change in the positional relationship between the projection apparatus 10 and the projection range 11, the control device 4 may perform a control of maintaining the projection position of the operation image 62 in the projection target object 6. For example, after the operation image 62 is projected by the processing illustrated in FIG. 10, the control device 4 repeatedly executes steps S102 to S104 illustrated in FIG. 10. In addition, as described above, it is assumed that the second information is the history of the projection control of shifting the projection range 11.

In this case, in a case where the control device 4 shifts the projection range 11, the second information acquired in step S102 also changes. Consequently, the positional relationship between the controller 52 and the projection range 11 determined in step S103 also changes. Accordingly, the position to which the operation image 62 is projected in step S104 also changes, and the projection position of the operation image 62 in the projection target object 6 is maintained. Thus, even in a case where the projection range 11 is shifted, it is possible to continue projecting the operation image 62 close to the projection apparatus 10, that is, close to the operator 8.

In addition, in a case where an amount of change in the positional relationship between the projection range 11 and the controller 52 is greater than or equal to a predetermined first amount of change, the control device 4 may change the projection position of the operation image 62 in the projection range 11. For example, after the operation image 62 is projected by the processing illustrated in FIG. 10, the control device 4 repeatedly executes steps S102 to S104 illustrated in FIG. 10. However, in a case where a difference (amount of change) between the positional relationship indicated by the second information acquired in step S102 and the positional relationship indicated by the previously acquired second information is less than a predetermined value, the control device 4 skips steps S103 and S104 and returns to step S102.

Accordingly, in a case where the controller 52 held by the operator 8 is slightly moved because of a shake of a hand or the like, the projection position of the operation image 62 can be stabilized by not updating the projection position of the operation image 62.

Modification Example

Modification Example 1

A configuration in which the control device 4 projects the operation image 62 to a position based on the second information in a case where the first operation that does not explicitly provide the control device 4 with the instruction of the projection position of the operation image 62 in the projection range 11 is received has been described. However, the control device 4 may receive, separately from the first operation, a second operation that is different from the first operation and that provides the instruction of the projection position of the operation image 62. In a case where the second operation is received, the control device 4 performs a control of projecting the operation image from the projection portion 1 to the projection position of which the instruction is provided by the received second operation.

Accordingly, in a case where the second operation that explicitly provides the control device 4 with the instruction of the projection position of the operation image 62 in the projection range 11 is received, the control device 4 may project the operation image 62 in accordance with the instruction.

Modification Example 2

While a case of applying the control device of the embodiment to the projection apparatus 10 has been described, the present invention is not limited to such a configuration. For example, the control device of the embodiment may be other devices that can directly or indirectly communicate with the projection apparatus 10. For example, the control device of the embodiment may be a personal computer that can communicate with the projection apparatus 10. In this case, the control device of the embodiment communicates with the projection apparatus 10 to execute the above various controls.

Modification Example 3

Embodiments 1 and 2 can also be implemented in combination with each other. For example, both of the operation portion provided in the body part 101 and the controller 52 may be the operation portion that receives the first operation. In this case, in a case where the operation portion provided in the body part 101 has received the first operation, the control device 4 projects the operation image 62 to a position determined based on the second information indicating the positional relationship between the operation portion and the projection range 11. In addition, in a case where the controller 52 has received the first operation, the control device 4 projects the operation image 62 to a position determined based on the second information indicating the positional relationship between the controller 52 and the projection range 11.

At least the following matters are disclosed in the present specification.

(1)

A control device of a projection apparatus that projects an image to a projection target object, the control device comprising a processor, in which the processor is configured to, in response to reception of a first operation by an operation portion for operating the projection apparatus, perform a control of projecting an operation image for operation of the projection apparatus from the projection apparatus to a part, in a projection range of the projection apparatus, determined based on second information different from first information obtained by the first operation performed on the operation portion.

(2)

The control device according to (1), in which the second information is information indicating a positional relationship between the operation portion and the projection range.

(3)

The control device according to (1) or (2), in which the processor is configured to perform a control of projecting the operation image to a part closest to the operation portion among a plurality of parts included in the projection range based on the second information.

(4)

The control device according to any one of (1) to (3), in which the operation portion includes an operation portion provided in the projection apparatus, and the second information is information indicating a positional relationship between the projection apparatus and the projection range.

(5)

The control device according to (4), in which the projection apparatus is capable of performing a projection control of changing the positional relationship between the projection apparatus and the projection range, and the second information is information based on the projection control.

(6)

The control device according to (4) or (5), in which the processor is configured to perform a control of maintaining a projection position of the operation image in the projection target object with respect to a change in the positional relationship between the projection apparatus and the projection range.

(7)

The control device according to any one of (1) to (6), in which the operation portion includes a controller with which the projection apparatus is remotely operable, and the second information is information indicating a positional relationship between the controller and the projection range.

(8)

The control device according to (7), in which the controller includes a sensor capable of detecting movement of the controller, and the second information is information based on detection information of the sensor.

(9)

The control device according to (8), in which the second information is information based on information indicating a positional relationship between the projection apparatus and the projection range and on the detection information of the sensor.

(10)

The control device according to any one of (7) to (9), in which the processor is configured to, in a case where an amount of change in the positional relationship between the controller and the projection range is greater than or equal to a first amount of change, perform a control of changing a projection position of the operation image in the projection range.

(11)

The control device according to any one of (1) to (10), in which the processor is configured to, in a state where a second operation that is different from the first operation and that provides an instruction of a projection position of the operation image is received, perform a control of projecting the operation image to the projection position based on the second operation.

(12)

A control method of a projection apparatus that projects an image to a projection target object, the control method comprising, by a processor of the projection apparatus, performing, in response to reception of a first operation by an operation portion for operating the projection apparatus, a control of projecting an operation image for operation of the projection apparatus from the projection apparatus to a part, in a projection range of the projection apparatus, determined based on second information different from first information obtained by the first operation performed on the operation portion.

(13)

The control method according to (12), in which the second information is information indicating a positional relationship between the operation portion and the projection range.

(14)

The control method according to (12) or (13), in which the processor is configured to perform a control of projecting the operation image to a part closest to the operation portion among a plurality of parts included in the projection range based on the second information.

(15)

The control method according to any one of (12) to (14), in which the operation portion includes an operation portion provided in the projection apparatus, and the second information is information indicating a positional relationship between the projection apparatus and the projection range.

(16)

The control method according to (15), in which the projection apparatus is capable of performing a projection control of changing the positional relationship between the projection apparatus and the projection range, and the second information is information based on the projection control.

(17)

The control method according to (15) or (16), in which the processor is configured to perform a control of maintaining a projection position of the operation image in the projection target object with respect to a change in the positional relationship between the projection apparatus and the projection range.

(18)

The control method according to any one of (12) to (17), in which the operation portion includes a controller with which the projection apparatus is remotely operable, and the second information is information indicating a positional relationship between the controller and the projection range.

(19)

The control method according to (18), in which the controller includes a sensor capable of detecting movement of the controller, and the second information is information based on detection information of the sensor.

(20)

The control method according to (19), in which the second information is information based on information indicating a positional relationship between the projection apparatus and the projection range and on the detection information of the sensor.

(21)

The control method according to any one of (18) to (20), in which the processor is configured to, in a case where an amount of change in the positional relationship between the controller and the projection range is greater than or equal to a first amount of change, perform a control of changing a projection position of the operation image in the projection range.

(22)

The control method according to any one of (12) to (21), in which the processor is configured to, in a state where a second operation that is different from the first operation and that provides an instruction of a projection position of the operation image is received, perform a control of projecting the operation image to the projection position based on the second operation.

(23)

A non-transitory computer readable medium storing a control program causing a processor of a projection apparatus that projects an image to a projection target object, to execute a process comprising performing, in response to reception of a first operation by an operation portion for operating the projection apparatus, a control of projecting an operation image for operation of the projection apparatus from the projection apparatus to a part, in a projection range of the projection apparatus, determined based on second information different from first information obtained by the first operation performed on the operation portion.

(24)

A projection system comprising a projection apparatus that projects an image to a projection target object, and a control device of the projection apparatus that, in response to reception of a first operation by an operation portion for operating the projection apparatus, performs a control of projecting an operation image for operation of the projection apparatus from the projection apparatus to a part, in a projection range of the projection apparatus, determined based on second information different from first information obtained by the first operation performed on the operation portion.

While various embodiments have been described above with reference to the drawings, the present invention is not limited to such examples. It is apparent that those skilled in the art may perceive various modification examples or correction examples within the scope disclosed in the claims, and those examples are also understood as falling in the technical scope of the present invention. In addition, each constituent in the embodiments may be arbitrarily combined without departing from the gist of the invention.

The present application is based on Japanese Patent Application (JP2020-191745) filed on Nov. 18, 2020, the content of which is incorporated in the present application by reference.

EXPLANATION OF REFERENCES

1: projection portion
2: operation reception portion
2A, 3A: hollow portion
2a, 2b, 3a, 3c, 15a: opening
4: control device
4a: storage medium
6: projection target object
8: operator
10: projection apparatus
11, 11a, 11b: projection range
12: light modulation unit
15: housing
21: light source
22: light modulation portion
23: projection optical system
24: control circuit
31: second optical system
32, 122: reflective member
33: third optical system
34: lens
52: controller
62: operation image
101: body part
102: first member
103: second member
104: projection direction changing mechanism
105: shift mechanism
106: optical unit
121: first optical system
G1: image

What is claimed is:

1. A control device of a projection apparatus that projects an image to a projection target object, the control device comprising:
a processor,
wherein the processor is configured to, in response to reception of a first operation by an operation portion for operating the projection apparatus, perform a control of projecting an operation image for operation of the projection apparatus from the projection apparatus to a part, in a projection range of the projection apparatus, determined based on second information different from first information obtained by the first operation performed on the operation portion,
the operation portion includes an operation portion provided in the projection apparatus,
the second information is information indicating a positional relationship between the projection apparatus and the projection range,
the projection apparatus is capable of performing a projection control of changing the positional relationship between the projection apparatus and the projection range,
the second information is information based on the projection control, and
the operation image is an image to perform an operation of shifting the projection range.

2. The control device according to claim 1,
wherein the second information is information indicating a positional relationship between the operation portion and the projection range.

3. The control device according to claim 1,
wherein the processor is configured to perform a control of projecting the operation image to a part closest to the operation portion among a plurality of parts included in the projection range based on the second information.

4. The control device according to claim 1,
wherein the processor is configured to perform a control of maintaining a projection position of the operation image in the projection target object with respect to a change in the positional relationship between the projection apparatus and the projection range.

5. A control device of a projection apparatus that projects an image to a projection target object, the control device comprising:
a processor,
wherein the processor is configured to, in response to reception of a first operation by an operation portion for operating the projection apparatus, perform a control of projecting an operation image for operation of the projection apparatus from the projection apparatus to a part, in a projection range of the projection apparatus, determined based on second information different from first information obtained by the first operation performed on the operation portion,
the operation portion includes a controller with which the projection apparatus is remotely operable,
the second information is information indicating a positional relationship between the controller and the projection range,
the controller includes a sensor capable of detecting movement of the controller,
the second information is information based on detection information of the sensor, and
the operation image is an image to perform an operation of shifting the projection range.

6. The control device according to claim 5,
wherein the second information is information based on information indicating a positional relationship between the projection apparatus and the projection range and on the detection information of the sensor.

7. The control device according to claim 5,
wherein the processor is configured to, in a case where an amount of change in the positional relationship between the controller and the projection range is greater than or equal to a first amount of change, perform a control of changing a projection position of the operation image in the projection range.

8. The control device according to claim 1,
wherein the processor is configured to, in a state where a second operation that is different from the first operation and that provides an instruction of a projection position of the operation image is received, perform a control of projecting the operation image to the projection position based on the second operation.

9. A control method of a projection apparatus that projects an image to a projection target object, the control method comprising:
by a processor of the projection apparatus,
performing, in response to reception of a first operation by an operation portion for operating the projection apparatus, a control of projecting an operation image for operation of the projection apparatus from the projection apparatus to a part, in a projection range of the projection apparatus, determined based on second information different from first information obtained by the first operation performed on the operation portion,
wherein the operation portion includes an operation portion provided in the projection apparatus,
the second information is information indicating a positional relationship between the projection apparatus and the projection range,
the projection apparatus is capable of performing a projection control of changing the positional relationship between the projection apparatus and the projection range,
the second information is information based on the projection control, and
the operation image is an image to perform an operation of shifting the projection range.

10. The control method according to claim 9,
wherein the second information is information indicating a positional relationship between the operation portion and the projection range.

11. The control method according to claim 9,
wherein the processor is configured to perform a control of projecting the operation image to a part closest to the operation portion among a plurality of parts included in the projection range based on the second information.

12. The control method according to claim 9,
wherein the processor is configured to perform a control of maintaining a projection position of the operation image in the projection target object with respect to a change in the positional relationship between the projection apparatus and the projection range.

13. A control method of a projection apparatus that projects an image to a projection target object, the control method comprising:
by a processor of the projection apparatus,
performing, in response to reception of a first operation by an operation portion for operating the projection apparatus, a control of projecting an operation image for operation of the projection apparatus from the projection apparatus to a part, in a projection range of the projection apparatus, determined based on second information different from first information obtained by the first operation performed on the operation portion,
wherein the operation portion includes a controller with which the projection apparatus is remotely operable,
the second information is information indicating a positional relationship between the controller and the projection range,
the controller includes a sensor capable of detecting movement of the controller,
the second information is information based on detection information of the sensor, and
the operation image is an image to perform an operation of shifting the projection range.

14. The control method according to claim 13,
wherein the second information is information based on information indicating a positional relationship between the projection apparatus and the projection range and on the detection information of the sensor.

15. The control method according to claim 13,
wherein the processor is configured to, in a case where an amount of change in the positional relationship between the controller and the projection range is greater than or equal to a first amount of change, perform a control of changing a projection position of the operation image in the projection range.

16. The control method according to claim 9,
wherein the processor is configured to, in a state where a second operation that is different from the first operation and that provides an instruction of a projection position of the operation image is received, perform a control of projecting the operation image to the projection position based on the second operation.

* * * * *